United States Patent
Liu et al.

(10) Patent No.: US 12,320,493 B1
(45) Date of Patent: Jun. 3, 2025

(54) FLEXIBLE WARNING LIGHT

(71) Applicant: JULUEN ENTERPRISE CO., LTD., New Taipei (TW)

(72) Inventors: Chao-Ching Liu, New Taipei (TW); Yi-Ting Huang, New Taipei (TW); Wen Lo, New Taipei (TW); Yu-Ting Lin, New Taipei (TW); Shuo-Ying Yen, New Taipei (TW)

(73) Assignee: Juluen Enterprise Co., Ltd., New Taipei (TW)

( * ) Notice: Subject to any disclaimer, the term of this patent is extended or adjusted under 35 U.S.C. 154(b) by 0 days.

(21) Appl. No.: 18/513,024

(22) Filed: Nov. 17, 2023

(51) Int. Cl.
| | |
|---|---|
| *F21S 8/00* | (2006.01) |
| *F21V 23/00* | (2015.01) |
| *F21V 29/74* | (2015.01) |
| *G08B 5/00* | (2006.01) |

(52) U.S. Cl.
CPC ............ *F21S 8/03* (2013.01); *F21V 23/004* (2013.01); *F21V 29/74* (2015.01); *G08B 5/006* (2013.01)

(58) Field of Classification Search
CPC ............ F21S 43/14; F21S 43/15; G08B 5/006
See application file for complete search history.

(56) References Cited

U.S. PATENT DOCUMENTS

| | | | |
|---|---|---|---|
| 11,180,076 B2* | 11/2021 | Baker | F21V 15/01 |
| 2010/0149828 A1* | 6/2010 | Koizumi | F21S 43/30 |
| | | | 362/543 |
| 2010/0214777 A1* | 8/2010 | Suehiro | F21V 29/75 |
| | | | 427/64 |
| 2011/0193480 A1* | 8/2011 | Bauer | B60Q 1/2696 |
| | | | 362/477 |
| 2012/0099326 A1* | 4/2012 | Hammond | F21S 43/14 |
| | | | 438/27 |
| 2013/0135855 A1* | 5/2013 | Wildner | G09F 9/301 |
| | | | 362/231 |
| 2015/0003083 A1* | 1/2015 | Uehara | F21S 43/14 |
| | | | 362/418 |
| 2017/0059134 A1* | 3/2017 | Back | F21S 4/28 |
| 2023/0036850 A1* | 2/2023 | Olsen | F21S 43/15 |

* cited by examiner

Primary Examiner — Zheng Song
(74) Attorney, Agent, or Firm — Winston Hsu

(57) ABSTRACT

A flexible warning light includes a lamp housing including a base with a bottom plate, a flexible lamp shell covering base and an accommodation space defined between base and flexible lamp shell, and a light-emitting device mounted in the accommodation space and having at least one light-emitting element on the top of a flexible circuit board of a light-emitting device on the top, and a first heat sink and multiple second heat sinks on the bottom. The flexible lamp shell will elastically deform in accordance with the surface curvature of a preset vehicle body to drive first heat sink and second heat sinks to deform so that the base can be closely attached to the curved surface of the preset vehicle body through the deformation of the first heat sink and the second heat sinks, so as to achieve the effect of being more compliant with the curved vehicle body.

9 Claims, 6 Drawing Sheets

FLEXIBLE WARNING LIGHT

BACKGROUND OF THE INVENTION

1. Field of the Invention

The present invention relates to a flexible warning light, in particular to a lamp shell made of a flexible material that is positioned on a curved surface of a vehicle body to be installed and then elastically deforms, thereby driving a first heat sink and at least one second heat sink in the base to deform, so that the base can be closely attached to the curved surface of the vehicle body to be installed to achieve the effect of being more compliant with the curved vehicle body.

2. Description of the Related Art

Today's electric vehicles are mostly designed with curved surfaces. The current warning lights have a rigid structure and cannot be installed snugly on curved vehicles. If a hard warning light is forcibly installed on the curved surface of an electric vehicle, it will cause the warning light to be unstable or even fall off the surface of the vehicle body, causing the warning light to malfunction. This is the key point that those engaged in this industry urgently want to study and improve.

SUMMARY OF THE INVENTION

The present invention has been accomplished under the circumstances in view. It is the main object of the present invention to provide a flexible warning light, which comprises: a lamp housing and a light-emitting device. The lamp housing comprises a base, a lamp shell, and an accommodation space defined between the base and the lamp shell. The base comprises a bottom plate. The lamp shell is made of a flexible material and covered on the base. The light-emitting device is mounted in the accommodation space. The light-emitting device comprises a flexible circuit board with at least one light-emitting element mounted on the flexible circuit board, and a first heat sink and at least one second heat sink provided on a bottom side of the flexible circuit board. The lamp shell made of a flexible material is elastically deformable in accordance with the surface curvature of a preset vehicle body to drive the first heat sink and the at least one second heat sink to deform, thereby fitting the base on the surface of the preset vehicle body.

It is another object of the present invention to provide a flexible warning light, wherein the first heat sink of the light-emitting device comprises a first wire hole for a plurality of predetermined wires to pass through and a plurality of reinforcement ribs protruding from two sides surfaces of the first wire hole for structural reinforcement; the at least one second heat sink of the light-emitting device each comprises a second wire hole corresponding to the first wire hole, and a plurality of grooves recessed on two opposite sides thereof for accommodating the reinforcement ribs. This further strengthens the structure to prevent the first heat sink and the at least one second heat sink from breaking when the lamp housing is bent.

It is still another object of the present invention to provide a flexible warning light, wherein the bottom plate of the base comprises a through hole for a plurality of predetermined wires to pass through; the flexible circuit board of the light-emitting device is provided with a plurality of positioning holes for the predetermined wires to pass through and position; the base comprises a positioning sleeve protruding from the bottom surface of the bottom plate around the periphery of the through hole of the bottom plate, at least one limiting block protruded from one side of the positioning sleeve, and a buffer pad assembled with the bottom surface of the bottom plate. The buffer pad comprises two notches respectively located on two opposite sides, an alignment hole sleeved on the positioning sleeve, and a limiting hole extended from at least one side of the alignment hole to accommodate the at least one limiting block respectively.

It is still another object of the present invention to provide a flexible warning light, wherein the base of the lamp housing is made of metal.

It is still another object of the present invention to provide a flexible warning light, wherein the base of the lamp housing is made of silicone material.

It is still another object of the present invention to provide a flexible warning light, wherein the base further comprises a convex plate extending upward from the periphery of the bottom plate and inserted into the lamp shell.

It is still another object of the present invention to provide a flexible warning light, wherein the lamp shell comprises a main body, and at least one lampshade mounted in the main body and covering said at least one light-emitting element on the flexible circuit board; the lamp shell further comprises a plurality of positioning bumps provided on at least two sides inside main body and resisted against the surface of said flexible circuit board, and a sealing flange was provided on the inner edge of said main body to fit and surround the periphery of the bottom plate.

DETAILED DESCRIPTION OF THE PREFERRED EMBODIMENT

Figure 1:
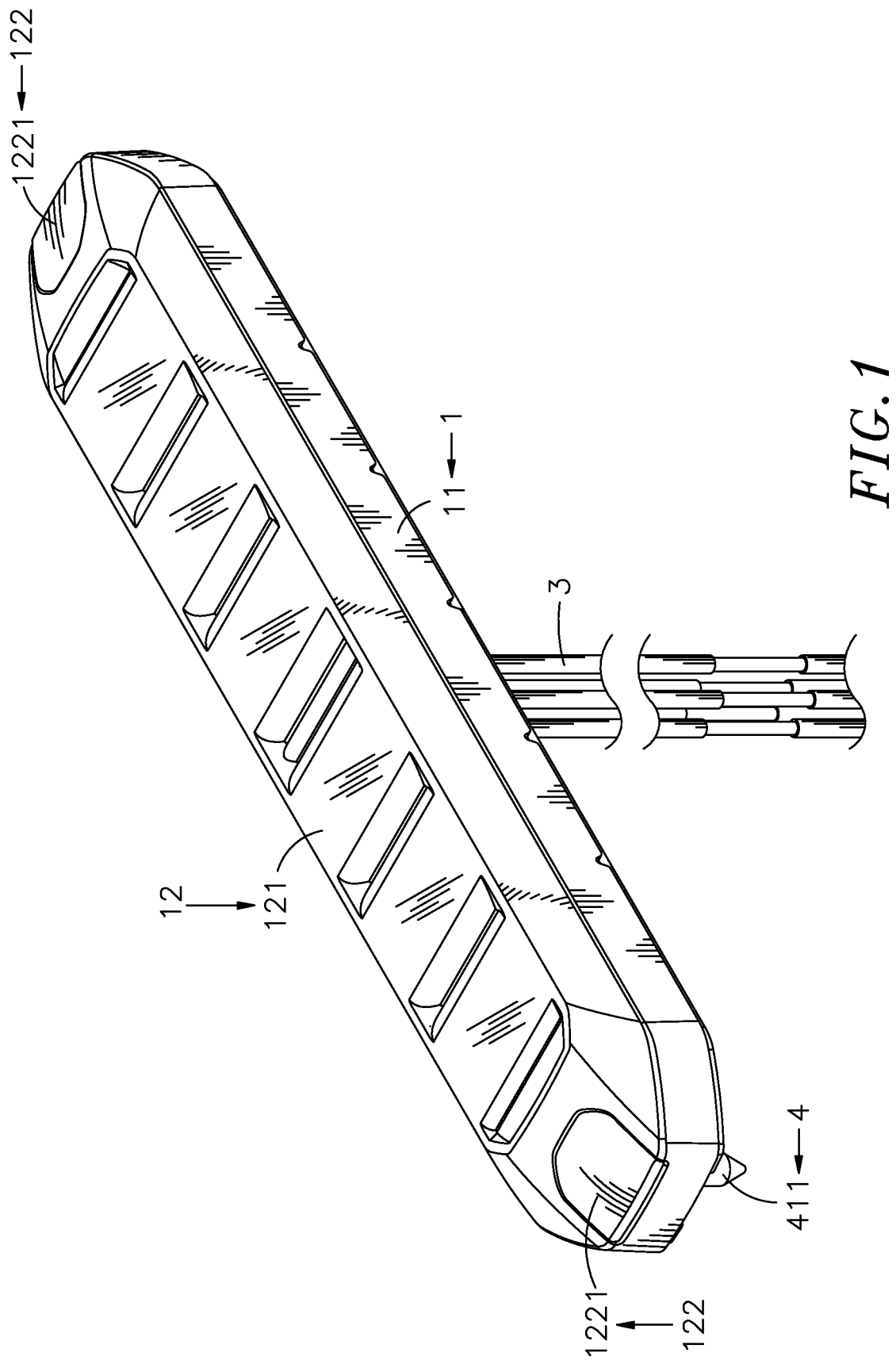
FIG. 1 is a three-dimensional appearance view of the present invention.
Figure 2:
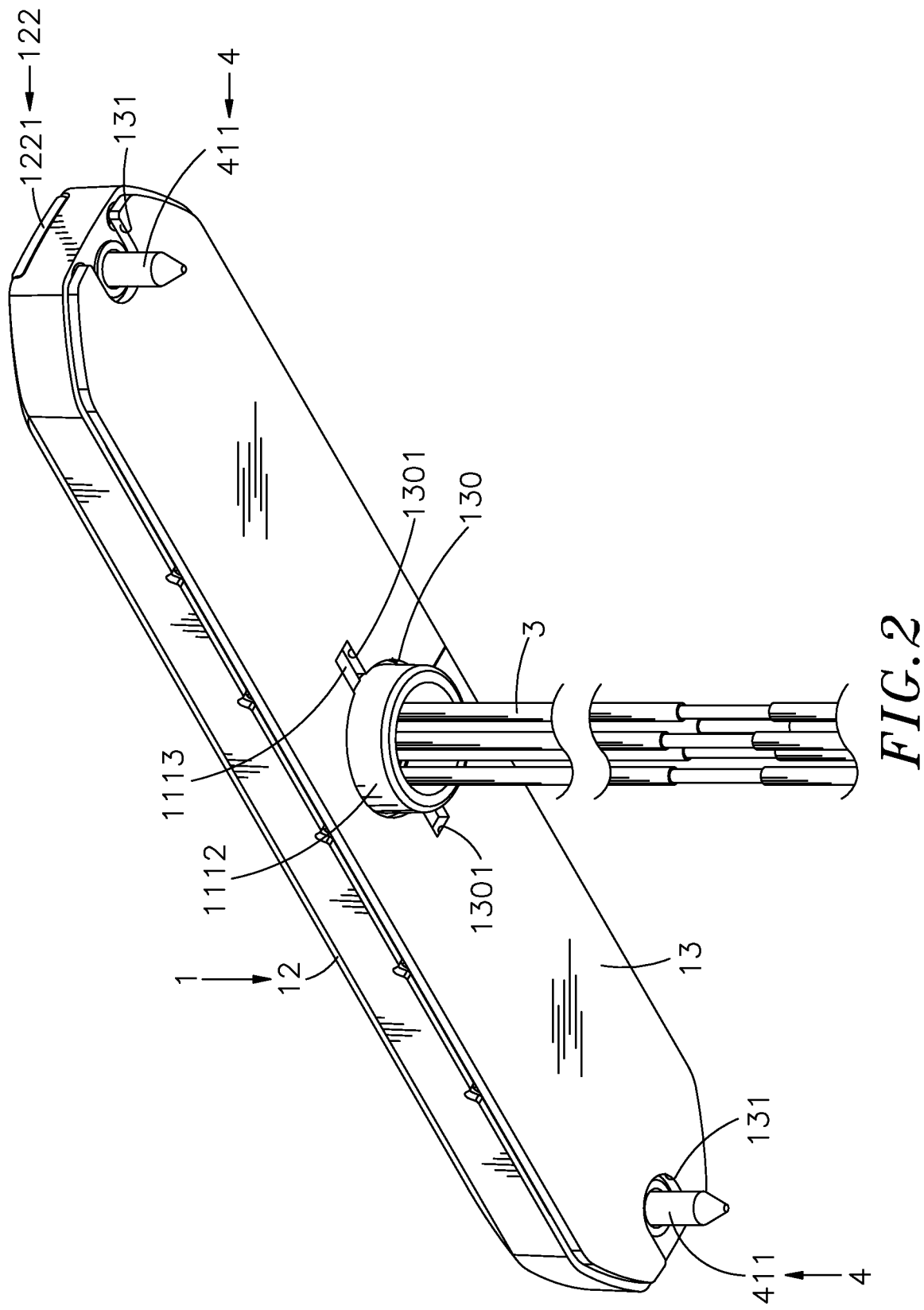
FIG. 2 is a three-dimensional appearance view of the present invention from another perspective.

Please refer to FIGS. 1 to 5. The flexible warning light of the present invention mainly comprises a lamp housing 1 and a light-emitting device 2. The connection relationship between the aforementioned components is as follows:

The lamp housing 1 comprises a base 11 and a lamp shell 12, and an accommodation space 10 is provided between the base 11 and the lamp shell 12. The base 11 is made of metal. The base 11 comprises a penetrated bottom plate 111 provided with a through hole 1110 for a plurality of wires 3 to pass through, a convex plate 1111 extending upward from the periphery of the bottom plate 111 and inserted into the lamp shell 12, a positioning sleeve 1112 protruding from the bottom surface of the bottom plate 111 around the periphery of the through hole 1110, at least one limiting block 1113 protruded from the positioning sleeve 1112, and a buffer pad 13 assembled with the bottom surface of the bottom plate 111. The buffer pad 13 concavely comprises two notches 131 respectively located on both sides, an alignment hole 130 sleeved on the positioning sleeve 1112, and at least one limiting hole 1301 extended from at least one side of the alignment hole 130 to corresponds to accommodate the at least one limiting block 1113 respectively.

The lamp shell 12 is made of a flexible material, and the lamp shell 12 comprises a main body 121, at least one lampshade 1211 mounted in the main body 121, and a plurality of mounts 122 located on at least two sides of the main body 121 for assembling on the vehicle to be installed.

The light-emitting device 2 is assembled in the accommodation space 10 between the base 11 and the lamp shell 12. The light-emitting device 2 comprises a flexible circuit board 21 provided with at least one light-emitting element 211 corresponding to the position of the at least one lampshade 1211 in the main body 121 and a plurality of positioning holes 210 for the wires 3 to pass through and set, and a first heat sink 22 and the at least one second heat sink 23 provided on the bottom side of the flexible circuit board 21. The first heat sink 22 is provided with a first wire hole 220 for the wires 3 to pass through, and reinforcement ribs 221 with a reinforced structure protruding from both side surfaces of the first wire hole 220 of the first heat sink 22. Each of the at least one second heat sink 23 is provided with a second wire hole 230 corresponding to the first wire hole 220, and grooves 231 for accommodating the reinforcement ribs 221 are recessed on both sides of the second heat sink 23.

Furthermore, when constructing the present invention, the wires 3 to be installed in the vehicle body (not shown in the FIG.) are first passed through the alignment hole 130 of the buffer pad 13, the through hole 1110 of the bottom plate 111, the first wire hole 220 of the first heat sink 22, and the second wire hole 230 of the second heat sink in sequence, and then positioned in the positioning holes 210 of the flexible circuit board 21 to form electrical connections with the flexible circuit board 21. Then cover the base 11 with the lamp shell 12 so that the light-emitting device 2 is located in the accommodation space 10, and the positioning bumps 14 provided on at least two sides inside the lamp housing 1 will resist the surface of the flexible circuit board 21, and then push the flexible circuit board 21 downward to press the first heat sink 22 and the at least one second heat sink 23 against the surface of the bottom plate 111 to form a position. At the same time, the at least one lampshade 1211 in the lamp shell 12 will cover the at least one light-emitting element 211 on the flexible circuit board 21 to guide light refraction, and the mounts 122 on at least two sides of the main body 121 of the lamp shell 12 will be positioned on the surface of the vehicle body to be installed. Then at least two fasteners 4 are respectively inserted into the fixing holes 1220 provided in the mounts 122 and locked to the surface of the vehicle body to be installed. Since the lamp shell 12 of the lamp housing 1 is made of a flexible material, after the two mounts 122 are positioned, the lamp shell 12 will elastically deform in accordance with the surface curvature of the vehicle body to be installed to drive the first heat sink 22 and the at least one second heat sink 23 to deform. Then, the base 11 is deformed by the influence of the first heat sink 22 and the at least one second heat sink 23 inside, so that the base 11 can closely contact the surface of the vehicle body to be installed. This completes the installation of the overall structure of the flexible warning light of the present invention.

Figure 3:
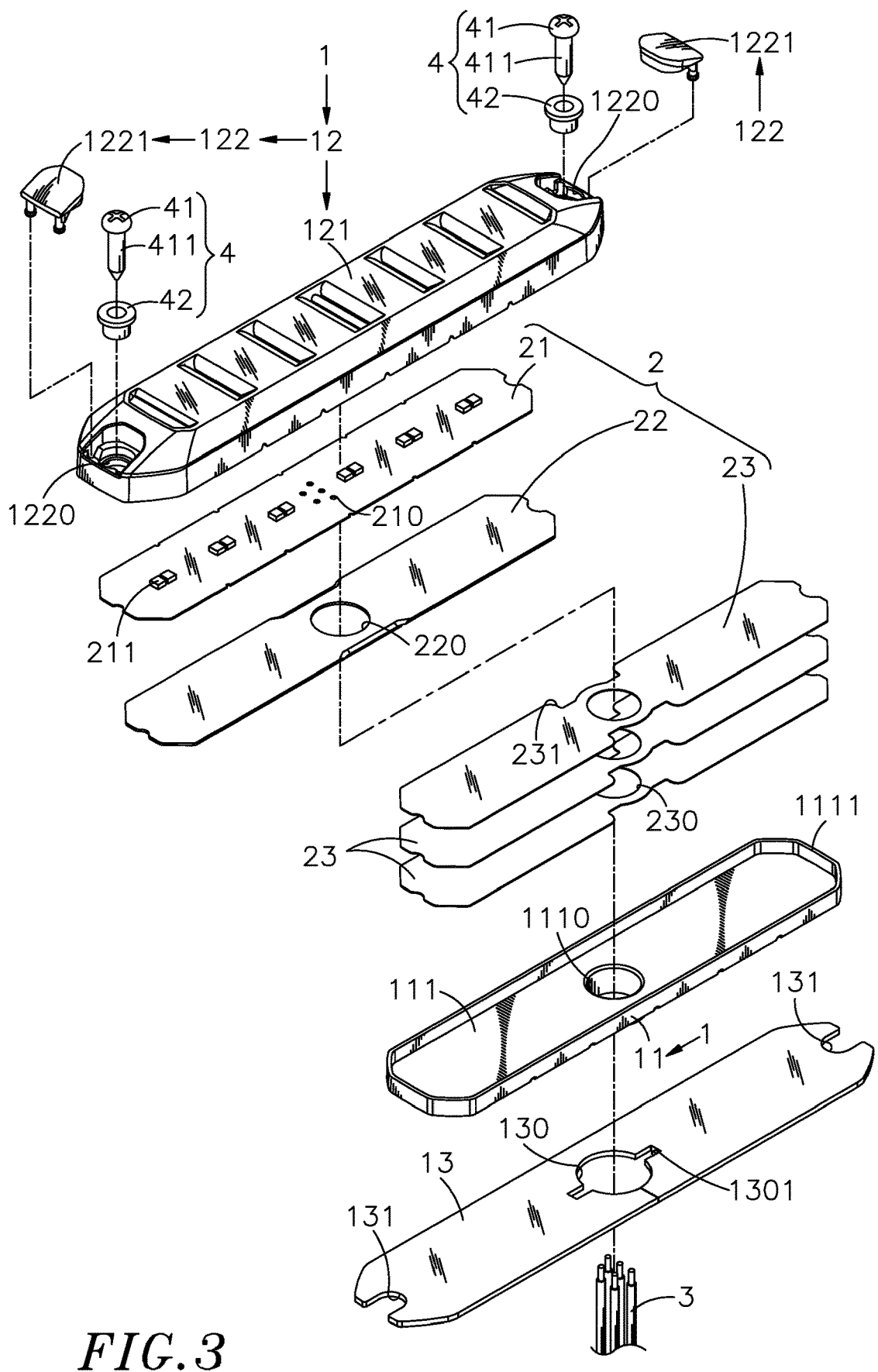
FIG. 3 is a three-dimensional exploded view of the present invention.
Figure 4:
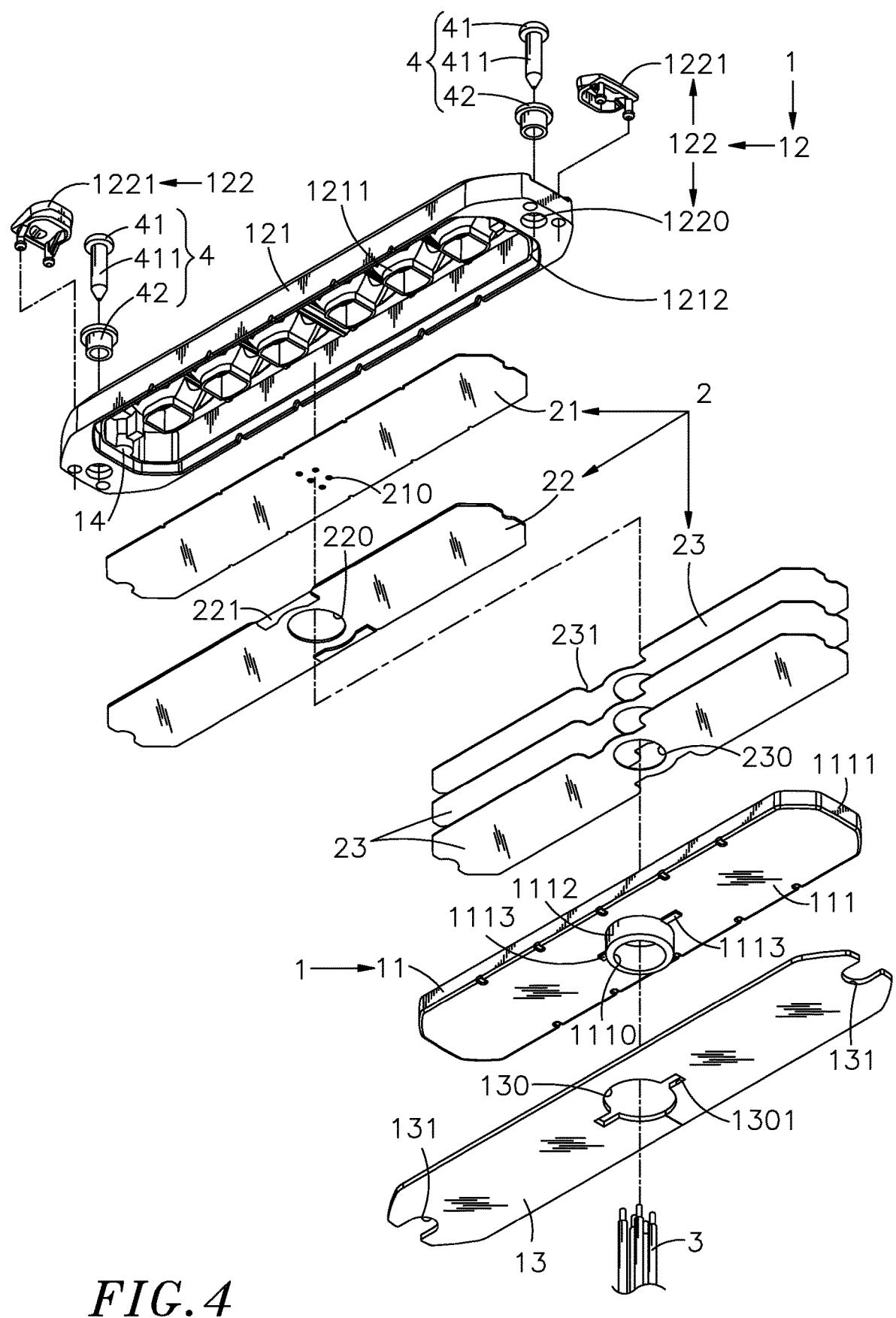
FIG. 4 is an exploded three-dimensional view of the present invention from another perspective.
Figure 5:
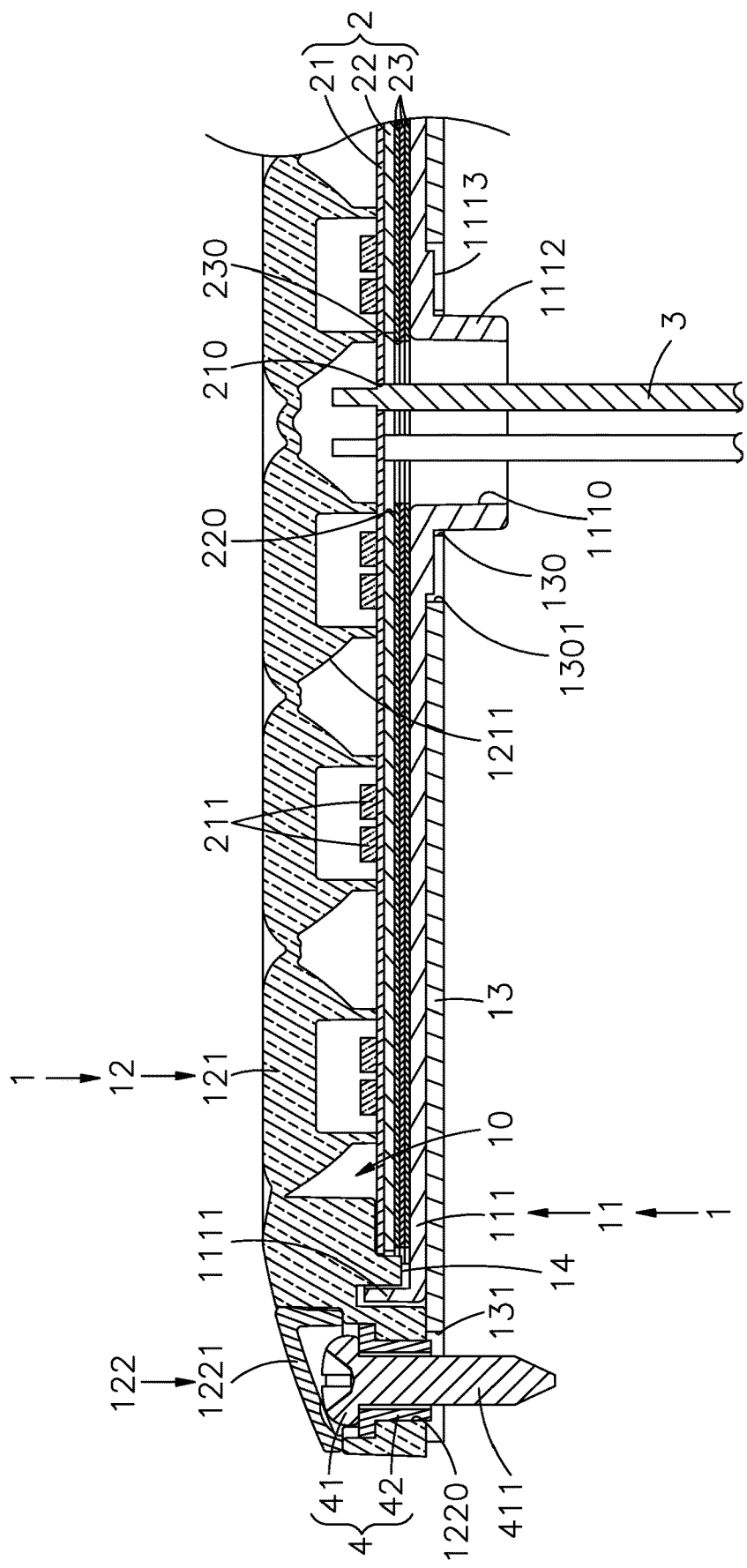
FIG. 5 is a side cross-sectional view of the present invention.

Please continue to refer to FIGS. 3 to 5. It can be clearly seen from the FIGS. that the first heat sink 22 and the at least one second heat sink 23 that are located between the base 11 and the lamp shell 12 and are attached to the flexible circuit board 21 will dissipate heat when the flexible circuit board 21 is operating. The quantity of the at least one second heat sink 23 can be adjusted according to the heat dissipation requirement of the flexible circuit board 21. The heat energy is transferred through the integrated structural surfaces of the first heat sink 22 and the at least one second heat sink 23 to reduce the heat accumulation inside the heat sink, and the base 11 made of metal is used to increase the transfer of heat energy to achieve more effective heat dissipation. The grooves 231 on both sides of the at least one second heat sink 23 will be sleeved on the two reinforcement ribs 221 protruding on the surface of the first heat sink 22 to form a structural reinforcement, thereby preventing the first heat sink 22 and the at least one second heat sink 23 from breaking when the lamp housing 1 is bent.

In addition, the thickness of the above-mentioned first heat sink 22 and the at least one second heat sink 23 is each respectively between 0.1 mm~1.5 mm. In a preferred implementation, the thickness of the first heat sink 22 and the at least one second heat sink 23 is each respectively between 0.2 mm and 0.8 mm. It uses multiple heat sinks to increase the bending feel and is easier to bend than a single heat sink.

In addition, in the preferred embodiment of the present invention, the base 11 of the lamp housing 1 is made of metal. However, the base 11 can also be made of silicone or plastic material that can deform in conjunction with the lamp shell 12. Such simple equivalent changes and modifications do not limit the scope of protection of the present invention and are hereby stated.

In addition, in the preferred embodiment of the present invention, the at least one lampshade 1211 provided in the main body 121 is in the shape of a square frame, a spherical shape, or other shapes that has the function of covering the at least one light-emitting element 211 and are hereby stated.

In addition, in this embodiment, the inner edge of the main body 121 of the lamp shell 12 is provided with a sealing flange 1212 that fits and surrounds the periphery of the bottom plate 111 to form a seal and achieve waterproof and dustproof effects.

Furthermore, the at least two fasteners 4 in this embodiment each have a head 41, and a stem 411 with a smaller outer diameter extends downward from the head 41, and inside the fixing holes 1220 of the mount 122 each are provided with a cap 42 for the stem 411 to be worn and fixed. The stems 411 will orderly pass through the fixing holes 1220 and the notches 131 of the buffer pad 13 in order and be positioned on the surface of the vehicle body to be installed. After positioning, flip covers 1221 are respectively assembled to the fixing holes 1220, thereby achieving the effect of firmly fixing the flexible warning light of the present invention.

Figure 6:
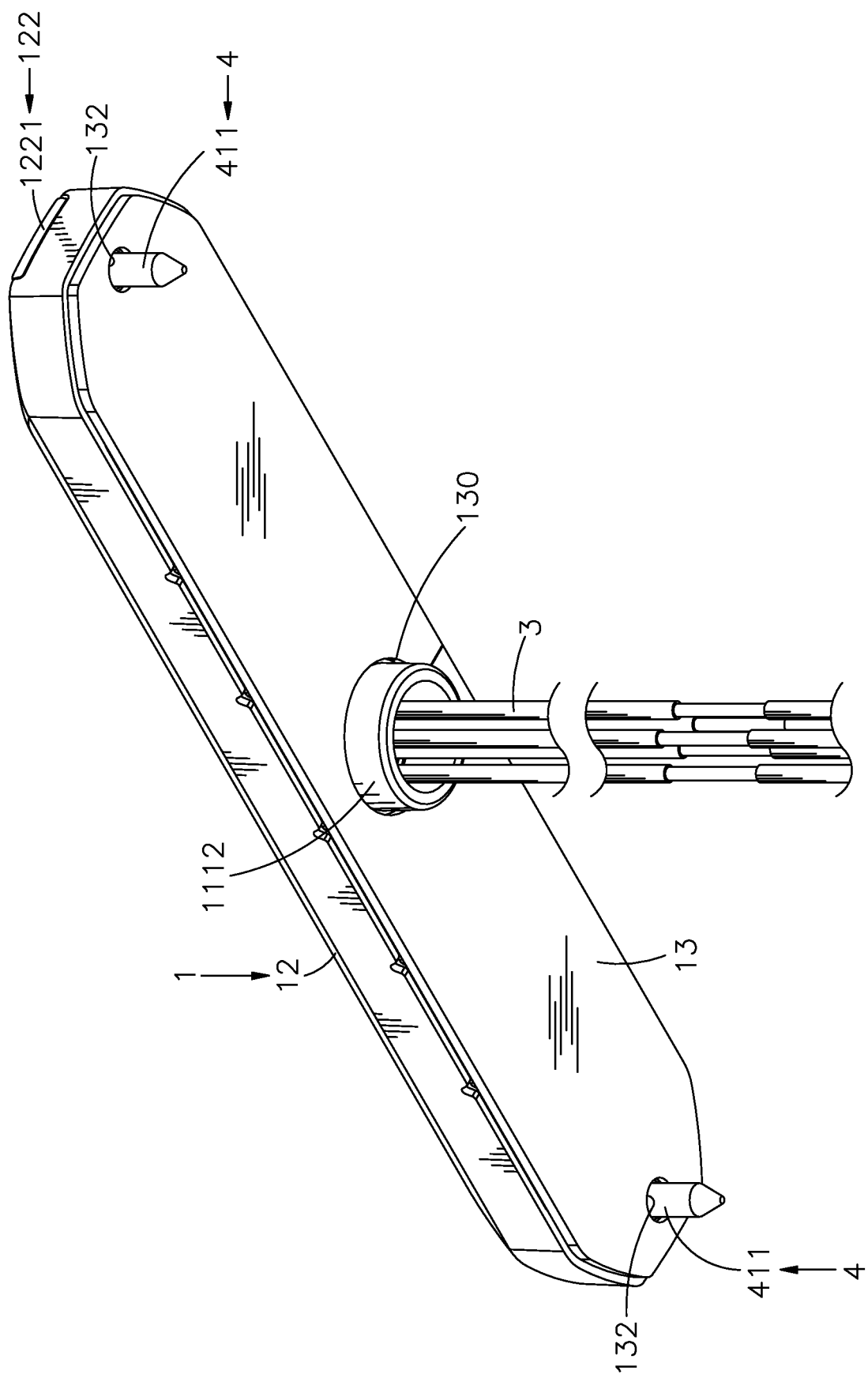
FIG. 6 is a three-dimensional appearance view of another embodiment of the present invention.

Please refer to FIG. 6, which is very similar to the structure disclosed in FIGS. 1 to 5, and the only difference is that the positioning sleeve 1112 protruding from the bottom side of the bottom plate 111 is not provided with the at least one limiting block 1113, and the buffer pad 13 is only provided with the alignment hole 130 for the positioning sleeve 1112 to pass through, and the two sides of the buffer pad 13 are provided with through holes 132 for the stems 411 of the fasteners 4 to pass through, so that the fasteners 4 can pass through the buffer pad 13 and be fixed on the surface of the vehicle body to be installed. The remaining structures disclosed in this embodiment are the same as those in FIGS. 1, 2, 3, 4, and 5, so they will not be described again here.

In addition, the present invention mainly uses the lamp shell 12 made of a flexible material positioned on the curved surface of the vehicle body to be installed and elastically deforms to drive the first heat sink 22 and the at least one second heat sink 23 to deform, so that the base 11 is deformed by the first heat sink 22 and the at least one second heat sink 23 and closely contacts the curved surface of the vehicle body to be installed, so as to achieve the effect of being more compliant with the curved vehicle body.

What the invention claimed is:

1. A flexible warning light, comprising: a lamp housing and a light-emitting device, wherein:
    said lamp housing comprises a base, a lamp shell and an accommodation space defined between said base and said lamp shell, said base comprising a bottom plate, said lamp shell being made of a flexible material and covered on said base;
    said light-emitting device is mounted in said accommodation space, said light-emitting device comprising a flexible circuit board, at least one light-emitting element mounted on said flexible circuit board and a first heat sink and at least one second heat sink provided on a bottom side of said flexible circuit board;
    said lamp shell made of a flexible material is elastically deformable in accordance with the surface curvature of a preset vehicle body to drive said first heat sink and said at least one second heat sink to deform, thereby fitting the surface of said preset vehicle body;
    wherein said first heat sink of said light-emitting device comprises a first wire hole for a plurality of predetermined wires to pass through, and a plurality of reinforcement ribs protruding from two side surfaces of said first wire hole for structural reinforcement; said at least one second heat sink of said light-emitting device each comprises a second wire hole corresponding to said first wire hole, and a plurality of grooves recessed on two sides thereof for accommodating said reinforcement ribs.

2. The flexible warning light as claimed in claim 1, wherein said lamp shell comprises a main body, and at least one lampshade mounted in said main body and covering said at least one light-emitting element on said flexible circuit board.

3. The flexible warning light as claimed in claim 2, wherein said lamp shell further comprises a plurality of mounts located on at least two sides of said main body for assembling on the surface of the preset vehicle.

4. The flexible warning light as claimed in claim 2, wherein said lamp shell further comprises a plurality of positioning bumps provided on at least two sides inside said main body and resisted against the surface of said flexible circuit board, and a sealing flange provided on an inner edge of said main body to fit and surround the periphery of said bottom plate.

5. The flexible warning light as claimed in claim 1, wherein said bottom plate of said base comprises a through hole for a plurality of predetermined wires to pass through, and said flexible circuit board of said light-emitting device is provided with a plurality of positioning holes for said predetermined wires to pass through and position.

6. The flexible warning light as claimed in claim 5, wherein said base comprises a positioning sleeve extending downward and protruding from the bottom surface of said bottom plate around the periphery of said through hole of said bottom plate, at least one limiting block protruded from said positioning sleeve, and a buffer pad assembled with the bottom surface of said bottom plate, said buffer pad comprising two notches respectively located on two opposite sides, an alignment hole sleeved on said positioning sleeve and at least one limiting hole extended from at least one side of said alignment hole to accommodate said at least one limiting block respectively.

7. The flexible warning light as claimed in claim 1, wherein said base of said lamp housing is made of metal.

8. The flexible warning light as claimed in claim 1, wherein a thickness of said first heat sink and said at least one second heat sink of said light-emitting device is each respectively 0.1 mm~1.5 mm.

9. The flexible warning light as claimed in claim 1, wherein said base further comprises a convex plate extending upward from the periphery of said bottom plate and inserted into said lamp shell.

* * * * *